United States Patent [19]

Bleicher et al.

[11] Patent Number: 6,084,698
[45] Date of Patent: Jul. 4, 2000

[54] SCANNING SYSTEM

[75] Inventors: Jakob Bleicher; Ernst Rothe, both of Munich; Manfred Knote; Wolfgang Riedel, both of Freiburg, all of Germany

[73] Assignee: Optische Werke G. Rodenstock, Munich, Germany

[21] Appl. No.: 08/998,574

[22] Filed: Dec. 29, 1997

Related U.S. Application Data

[63] Continuation of application No. 08/624,420, filed as application No. PCT/DE95/00996, Aug. 1, 1995, abandoned.

[30] Foreign Application Priority Data

Aug. 1, 1994 [DE] Germany ............................ 44 27 230

[51] Int. Cl.$^7$ .................................................. G02B 26/08
[52] U.S. Cl. ......................... 359/204; 359/205; 359/216; 359/212; 359/214; 359/215
[58] Field of Search ................... 359/196–226, 359/641, 754, 763, 771, 784, 659–660, 661

[56] References Cited

U.S. PATENT DOCUMENTS

| | | |
|---|---|---|
| 4,950,889 | 8/1990 | Budd et al. . |
| 5,124,829 | 6/1992 | Ishikawa . |
| 5,270,851 | 12/1993 | Makino et al. . |

FOREIGN PATENT DOCUMENTS

| | | |
|---|---|---|
| 63-103206 | 5/1988 | Japan . |
| 4-340519 | 11/1992 | Japan . |

*Primary Examiner*—James Phan
*Attorney, Agent, or Firm*—Antonelli, Terry, Stout & Kraus, LLP

[57] ABSTRACT

Disclosed is a scanning system having
- a light source,
- a collimator lens,
- a scanning unit and
- a scanning objective. The present invention is distinguished by that for the correction of the chromatic aberration over a large wavelength range, only the transverse chromatic aberration of the scanning objective is corrected, and that the intersection lengths of the light rays having wavelengths in the wavelength range over which the scanning system is to be corrected chromatically is dimensioned after the collimator lens in such a manner that the longitudinal chromatic aberration of the scanning system is compensated as well.

17 Claims, No Drawings

SCANNING SYSTEM

CROSS-REFERENCE TO RELATED APPLICATION

This is a continuation of U.S. application Ser. No. 08/624,420, filed Jul. 26, 1996, abandoned, which is a 371 of PCT/DE95/0099 filed Aug. 1, 1995, the subject matter of which is incorporated by reference herein.

DESCRIPTION

1. Technical Field

The present invention relates to a scanning system having a light source, a collimator lens, a scanning unit and a scanning objective.

2. State of the Art

Usually so-called F/θ-lenses are used in scanning systems, because there is no linearity between the "scanning angle" and the picture height if "distortion-free" lenses are used.

Most of the prior art scanning lenses are de facto only corrected monochromatically. The reason for this is that, on the one hand, in the past scanning systems were designed solely with high-performance monochromatic light sources such as lasers or laser diodes. On the other hand, due to the "extremely one-sided" design of the scanning objectives, the shutter position outside the F/θ lens is mentioned only by way of example, it is very difficult to correct scanning objectives over a large wavelength range.

A F/θ lens, which, by way of illustration, is corrected at least approximately chromatically over a major part of the visible range of the spectrum, that is, e.g., between 400 and 680 nm, usually has twice the number of lenses as an only monochromatically corrected lens.

Hitherto there is no known scanning objective, which is well corrected, at reasonable cost and with acceptable complexity, over the entire range of the visible spectrum or for several laser wavelengths, by way of illustration 633 nm, 830 nm and simultaneously 1064 nm.

DESCRIPTION OF THE INVENTION

The object of the present invention is to provide a scanning system in which chromatic aberrations have been corrected over a large wavelength range while keeping its construction as simple and economical as possible.

The present invention is based on the fundamental idea that not the correction of the individual components is decisive for the optical performance of a generic scanning system, but rather the correction of all the chromatic aberrations of the entire system.

In order to apply the fundamental concept of the present invention, the scanning objective is corrected only with respect to transverse chromatic aberration. In order to correct the longitudinal chromatic aberration and thus the entire chromatic aberration, the intersection lengths or focal intercepts of the light rays having wavelengths in the wavelength range in which the scanning system is to be corrected with respect to chromatic aberration which are located after or behind the collimator lens are dimensioned in such a manner that the scanning system is also compensated with respect to the longitudinal chromatic aberration.

This dimensioning of the intersection lengths or focal intercepts may occur in several ways:

By way of illustration, the light bundles of several light sources emitting in varying wavelength ranges can be reflected into the collimator lens by means of mirrors and the pictures or images of these several light sources can be positioned after the collimator lens in such a manner that the scanning objective focuses all the images in one plane. This can be realized, by way of illustration, in that the (approximately) dot-shaped light sources are spaced at varying distances from the collimator lens.

Alternatively, the collimator lens may have a longitudinal chromatic aberration which compensates the longitudinal chromatic aberration of the scanning objective.

Regardless which of these alternatives is realized, it is preferred if the last lens of the scanning objective, seen from the scanning unit, is a lens which has a negative refractive power and is composed of a glass having an Abbe number smaller than 55 and whose first surface has a center of curvature that lies on the scanning unit side. This embodiment permits, in particular, correcting the transverse chromatic aberration.

Another preferred embodiment of the invented scanning system according to which the first surface of the first-lens, seen from the scanning unit, of the scanning objective has a center of curvature that lies on the scanning unit side.

This embodiment permits, in particular, easier correction of the distortion of the invented scanning system more easily.

Furthermore, it is particularly advantageous for correcting distortions and chromatic aberrations if the distance between the apex of the first lens of the scanning objective and the scanning unit is larger than 0.7 times the diameter of the pupil of the objective.

Freedom of vignetting is further achieved in that the mechanical limitation of the beam path lies before the scanning unit.

An embodiment of the invented scanning system which permits particularly good correction of the transverse chromatic aberration and in which the following applies for the scanning objective:

first lens: positive refractive power, Abbe number>50 last lens: negative refractive power, Abbe number<55.

Furthermore, in this embodiment it is preferred for the ratio of the radius of the curvature of the second surface of the first lens to the radius of the curvature of the first surface of the second lens is:

$$0.5 < r_2/r_3 < 2.5,$$

preferably $$0.75 < r_2/r_3 < 1.38.$$

By this means the aperture aberrations of the 3rd and higher orders including the asymmetrical aberrations can be corrected particularly well.

In another embodiment, of the invented scanning system by means of which further correction of the transverse chromatic aberration is achieved, the following applies for the scanning objective:

second to last lens: positive refractive power, Abbe number>50 last lens: negative refractive power, Abbe number<55.

In this embodiment, it is moreover preferred for the ratio of the radius of the curvature of the second surface of the second to the last lens to the radius of curvature of the first surface of the last lens is:

$$0.55 < r_{2\nu 1}/r_{11} < 1.55,$$

preferably $$0.69 < r_{2v1}/r_{11} < 1.44.$$

This embodiment facilitates further correction of the aperture aberration and the asymmetrical aberration.

The scanning objective of the invented scanning system can be provdied with three, four, or more lenses depending on how "well" the modulation transmission function (MTF) is to be designed.

The collimator lens can be designed as an achromat or as a single lens. The use of an achromat has the advantage that it facilitates correction of the longitudinal chromatic aberration.

The present invention is made more apparent by way of example in the following, without the intention of limiting the scope or spirit of the overall inventive idea, using 16 preferred embodiments.

The lenses utilized in the invented scanning systems are given in tables 1 to 16, with the individual surfaces being numbered successively in the direction of the scanning light beams. BL stands for the aperture of the scanning system.

In table I, a collimator lens is provided, by way of example, which compensates the longitudinal chromatic aberration of the scanning objective shown in table 1 in such a manner that the modulation transmission function is practically constant over the entire utilized wavelength range over the entire scanning angle.

In the following tables
| | |
|---|---|
| ri | stands for the radii of curvature of the i-th surface, |
| di | stands for the lens thickness respective the air gaps between the i-th and (i+1)-th surface, |
| ni | stands for the refraction indices of the lens materials and |
| vi | stands for the Abbe numbers. |

The materials data ni and vi are each given for the wavelength 514 nm.

TABLE 1

| | r | d | n | v |
|---|---|---|---|---|
| BL | — | 40.0 | | |
| 1 | −78.6 | | | |
| | | 10.0 | 1.62 | 63 |
| 2 | −63.3 | | | |
| | | 0.9 | | |
| 3 | −64.2 | | | |
| | | 5.0 | 1.55 | 49 |
| 4 | −86.6 | | | |
| | | 1.3 | | |
| 5 | −633.2 | | | |
| | | 10.0 | 1.62 | 63 |
| 6 | −147.5 | | | |
| | | 4.0 | | |
| 7 | −129.1 | | | |
| | | 5.0 | 1.61 | 44 |
| 8 | −300.7 | | | |
| | | 1370.4 | | |
| image plane BE | | | | |
| BE | | | | |
| | | 400.0 | | |
| 1 | 791.5 | | | |
| | | 3.0 | 1.61 | 44.3 |
| 2 | 129.6 | | | |
| | | 0.02 | | |

TABLE 1-continued

| | r | d | n | v |
|---|---|---|---|---|
| 3 | 139.2 | | | |
| | | 5.0 | 1.62 | 63.5 |
| 4 | −309.5 | | | |
| BL | | | | |

TABLE 2

| | r | d | n | v |
|---|---|---|---|---|
| BL | | | | |
| | | 30.0 | | |
| 1 | −63.26 | | | |
| | | 6.0 | 1.62 | 63 |
| 2 | −59.32 | | | |
| | | 3.0 | | |
| 3 | −42.69 | | | |
| | | 3.9 | 1.55 | 49 |
| 4 | −45.79 | | | |
| | | 1.0 | | |
| 5 | 2995.26 | | | |
| | | 6.0 | 1.57 | 61 |
| 6 | −7000.22 | | | |
| | | 3.0 | | |
| 7 | −585.12 | | | |
| | | 7.8 | 1.62 | 44 |
| 8 | −233.20 | | | |
| | | 1062.8 | | |
| BE | | | | |

TABLE 3

| | r | d | n | v |
|---|---|---|---|---|
| BL | | | | |
| | | 30.0 | | |
| 1 | −63.91 | | | |
| | | 7.8 | 1.62 | 63 |
| 2 | −59.28 | | | |
| | | 1.5 | | |
| 3 | −50.89 | | | |
| | | 3.9 | 1.55 | 49 |
| 4 | −57.27 | | | |
| | | 1.0 | | |
| 5 | −1011.10 | | | |
| | | 7.8 | 1.62 | 63 |
| 6 | −115.87 | | | |
| | | 3.1 | | |
| 7 | −115.70 | | | |
| | | 3.9 | 1.62 | 44 |
| 8 | −492.35 | | | |
| | | 1056.2 | | |
| BE | | | | |

TABLE 4

| | r | d | n | v |
|---|---|---|---|---|
| BL | | | | |
| | | 30.0 | | |
| 1 | −59.21 | | | |
| | | 4.0 | 1.62 | 63 |
| 2 | −54.98 | | | |
| | | 5.0 | | |
| 3 | −37.72 | | | |
| | | 3.9 | 1.55 | 49 |
| 4 | −40.68 | | | |
| | | 1.0 | | |
| 5 | −1469.15 | | | |
| | | 7.8 | 1.62 | 63 |

TABLE 4-continued

|    | r       | d      | n    | v  |
|----|---------|--------|------|----|
| 6  | −130.64 |        |      |    |
|    |         | 3.1    |      |    |
| 7  | −133.53 |        |      |    |
|    |         | 3.9    | 1.62 | 44 |
| 8  | −844.32 |        |      |    |
| BE |         | 1038.3 |      |    |

TABLE 5

|    | r        | d      | n    | v  |
|----|----------|--------|------|----|
| BL |          | 30.0   |      |    |
| 1  | −58.98   |        |      |    |
|    |          | 5.0    | 1.62 | 63 |
| 2  | −57.20   |        |      |    |
|    |          | 8.0    |      |    |
| 3  | −42.74   |        |      |    |
|    |          | 3.9    | 1.55 | 49 |
| 4  | −46.19   |        |      |    |
|    |          | 1.0    |      |    |
| 5  | −2639.88 |        |      |    |
|    |          | 7.8    | 1.62 | 63 |
| 6  | −169.73  |        |      |    |
|    |          | 7.0    |      |    |
| 7  | −236.74  |        |      |    |
|    |          | 3.9    | 1.62 | 44 |
| 8  | 1266.32  |        |      |    |
| BE |          | 1024.2 |      |    |

TABLE 6

|    | r       | d      | n    | v  |
|----|---------|--------|------|----|
| BL |         | 30.0   |      |    |
| 1  | −63.10  |        |      |    |
|    |         | 7.8    | 1.62 | 63 |
| 2  | −44.38  |        |      |    |
|    |         | 0.7    |      |    |
| 3  | −43.70  |        |      |    |
|    |         | 3.9    | 1.55 | 49 |
| 4  | −71.59  |        |      |    |
|    |         | 1.0    |      |    |
| 5  | −741.06 |        |      |    |
|    |         | 7.8    | 1.62 | 63 |
| 6  | −181.65 |        |      |    |
|    |         | 3.1    |      |    |
| 7  | −245.97 |        |      |    |
|    |         | 3.9    | 1.62 | 44 |
| 8  | −543.80 |        |      |    |
| BE |         | 1063.1 |      |    |

TABLE 7

|    | r      | d    | n    | v  |
|----|--------|------|------|----|
| BL |        | 30.0 |      |    |
| 1  | −63.28 |      |      |    |
|    |        | 7.8  | 1.62 | 63 |
| 2  | −44.90 |      |      |    |
|    |        | 0.7  |      |    |
| 3  | −44.17 |      |      |    |
|    |        | 3.9  | 1.55 | 49 |
| 4  | −71.61 |      |      |    |
|    |        | 1.0  |      |    |

TABLE 7-continued

|    | r       | d      | n    | v  |
|----|---------|--------|------|----|
| 5  | −748.37 |        |      |    |
|    |         | 7.8    | 1.62 | 63 |
| 6  | −182.69 |        |      |    |
|    |         | 3.1    |      |    |
| 7  | −245.51 |        |      |    |
|    |         | 3.9    | 1.68 | 37 |
| 8  | −528.01 |        |      |    |
| BE |         | 1062.8 |      |    |

TABLE 8

|    | r        | d      | n    | v  |
|----|----------|--------|------|----|
| BL |          | 40.0   |      |    |
| 1  | −44.28   |        |      |    |
|    |          | 7.8    | 1.62 | 63 |
| 2  | −51.78   |        |      |    |
|    |          | 1.0    |      |    |
| 3  | −1496.72 |        |      |    |
|    |          | 7.8    | 1.62 | 63 |
| 4  | −122.88  |        |      |    |
|    |          | 3.1    |      |    |
| 5  | −454.34  |        |      |    |
|    |          | 3.9    | 1.69 | 37 |
| 6  | 618.61   |        |      |    |
| BE |          | 1059.8 |      |    |

TABLE 9

|    | r       | d      | n    | v  |
|----|---------|--------|------|----|
| BL |         | 30.0   |      |    |
| 1  | −42.09  |        |      |    |
|    |         | 6.0    | 1.62 | 63 |
| 2  | −49.27  |        |      |    |
|    |         | 1.0    |      |    |
| 3  | −577.94 |        |      |    |
|    |         | 7.8    | 1.62 | 63 |
| 4  | −104.31 |        |      |    |
|    |         | 3.1    |      |    |
| 5  | −341.01 |        |      |    |
|    |         | 6.0    | 1.69 | 37 |
| 6  | 1108.68 |        |      |    |
| BE |         | 1051.1 |      |    |

TABLE 10

|    | r        | d    | n    | v  |
|----|----------|------|------|----|
| BL | —        | 30.0 |      |    |
| 1  | −63.26   |      |      |    |
|    |          | 6.0  | 1.62 | 63 |
| 2  | −59.32   |      |      |    |
|    |          | 3.0  |      |    |
| 3  | −42.69   |      |      |    |
|    |          | 3.9  | 1.55 | 49 |
| 4  | −45.79   |      |      |    |
|    |          | 1.9  |      |    |
| 5  | 2995.25  |      |      |    |
|    |          | 6.0  | 1.56 | 61 |
| 6  | −7000.22 |      |      |    |
|    |          | 3.0  |      |    |
| 7  | −585.12  |      |      |    |
|    |          | 7.8  | 1.62 | 63 |

TABLE 10-continued

|    | r       | d      | n    | v  |
|----|---------|--------|------|----|
| 8  | −119.37 |        |      |    |
|    |         | 3.1    |      |    |
| 9  | −111.22 |        | 1.61 | 44 |
|    |         | 3.9    |      |    |
| 10 | −398.23 |        |      |    |
| BE |         | 1045.5 |      |    |

TABLE 11

|    | r        | d      | n    | v  |
|----|----------|--------|------|----|
| BL | —        |        |      |    |
|    |          | 30.0   |      |    |
| 1  | −64.13   |        |      |    |
|    |          | 6.0    | 1.62 | 63 |
| 2  | −60.47   |        |      |    |
|    |          | 6.0    |      |    |
| 3  | −41.57   |        |      |    |
|    |          | 3.9    | 1.55 | 49 |
| 4  | −44.51   |        |      |    |
|    |          | 1.0    |      |    |
| 5  | 2995.42  |        |      |    |
|    |          | 6.0    | 1.56 | 61 |
| 6  | −7000.32 |        |      |    |
|    |          | 3.0    |      |    |
| 7  | −554.36  |        |      |    |
|    |          | 7.8    | 1.62 | 63 |
| 8  | −120.93  |        |      |    |
|    |          | 3.1    |      |    |
| 9  | −116.96  |        | 1.61 | 44 |
|    |          | 3.9    |      |    |
| 10 | −423.42  |        |      |    |
| BE |          | 1045.0 |      |    |

TABLE 12

|    | r        | d      | n    | v  |
|----|----------|--------|------|----|
| BL |          | 30.0   |      |    |
| 1  | −62.59   |        |      |    |
|    |          | 6.0    | 1.62 | 63 |
| 2  | −59.34   |        |      |    |
|    |          | 6.0    |      |    |
| 3  | −43.10   |        |      |    |
|    |          | 3.9    | 1.55 | 49 |
| 4  | −46.36   |        |      |    |
|    |          | 1.0    |      |    |
| 5  | −1560.54 |        |      |    |
|    |          | 6.0    | 1.56 | 61 |
| 6  | −1966.66 |        |      |    |
|    |          | 3.0    |      |    |
| 7  | −1730.18 |        |      |    |
|    |          | 7.8    | 1.62 | 63 |
| 8  | −131.09  |        |      |    |
|    |          | 3.1    |      |    |
| 9  | −128.58  |        | 1.61 | 44 |
|    |          | 3.9    |      |    |
| 10 | −590.44  |        |      |    |
| BE |          | 1045.0 |      |    |

TABLE 13

|    | r    | d    | n | v |
|----|------|------|---|---|
| BL | —    |      |   |   |
|    |      | 30.0 |   |   |

TABLE 13-continued

|    | r        | d      | n    | v  |
|----|----------|--------|------|----|
| 1  | −64.03   |        |      |    |
|    |          | 6.0    | 1.62 | 63 |
| 2  | −60.70   |        |      |    |
|    |          | 6.0    |      |    |
| 3  | −41.37   |        |      |    |
|    |          | 3.9    | 1.55 | 49 |
| 4  | −44.08   |        |      |    |
|    |          | 1.0    |      |    |
| 5  | −1514.35 |        |      |    |
|    |          | 6.0    | 1.56 | 61 |
| 6  | −2564.90 |        |      |    |
|    |          | 3.0    |      |    |
| 7  | −1686.16 |        |      |    |
|    |          | 7.8    | 1.62 | 63 |
| 8  | −128.13  |        |      |    |
|    |          | 3.1    |      |    |
| 9  | −121.48  |        | 1.61 | 44 |
|    |          | 3.9    |      |    |
| 10 | −508.97  |        |      |    |
| BE |          | 1046.7 |      |    |

TABLE 14

|    | r        | d      | n    | v  |
|----|----------|--------|------|----|
| BL | —        |        |      |    |
|    |          | 30.0   |      |    |
| 1  | −143.89  |        |      |    |
|    |          | 6.0    | 1.62 | 63 |
| 2  | −117.01  |        |      |    |
|    |          | 10.0   |      |    |
| 3  | −50.31   |        |      |    |
|    |          | 3.9    | 1.55 | 49 |
| 4  | −52.93   |        |      |    |
|    |          | 1.0    |      |    |
| 5  | −122.60  |        |      |    |
|    |          | 6.0    | 1.56 | 61 |
| 6  | −1239.61 |        |      |    |
|    |          | 3.0    |      |    |
| 7  | −3464.52 |        |      |    |
|    |          | 20.0   | 1.62 | 63 |
| 8  | −76.05   |        |      |    |
|    |          | 3.1    |      |    |
| 9  | −75.42   |        | 1.61 | 44 |
|    |          | 3.9    |      |    |
| 10 | −147.57  |        |      |    |
| BE |          | 1093.2 |      |    |

TABLE 15

|    | r        | d    | n    | v  |
|----|----------|------|------|----|
| BL | —        |      |      |    |
|    |          | 50.0 |      |    |
| 1  | −57.68   |      |      |    |
|    |          | 6.0  | 1.62 | 63 |
| 2  | −56.92   |      |      |    |
|    |          | 4.0  |      |    |
| 3  | −50.00   |      |      |    |
|    |          | 3.9  | 1.55 | 49 |
| 4  | −54.52   |      |      |    |
|    |          | 1.0  |      |    |
| 5  | 3868.37  |      |      |    |
|    |          | 6.0  | 1.56 | 61 |
| 6  | −7809.38 |      |      |    |
|    |          | 3.0  |      |    |
| 7  | −342.41  |      |      |    |
|    |          | 13.0 | 1.62 | 63 |
| 8  | −95.71   |      |      |    |
|    |          | 3.1  |      |    |

TABLE 15-continued

|    | r       | d      | n    | v  |
|----|---------|--------|------|----|
| 9  | −95.36  |        | 1.61 | 44 |
|    |         | 3.9    |      |    |
| 10 | −245.71 |        |      |    |
|    |         | 1066.7 |      |    |
| BE |         |        |      |    |

TABLE 16

|    | r        | d      | n    | v  |
|----|----------|--------|------|----|
| BL | —        |        |      |    |
|    |          | 50.0   |      |    |
| 1  | −62.15   |        |      |    |
|    |          | 7.75   | 1.62 | 63 |
| 2  | −57.06   |        |      |    |
|    |          | 3.0    |      |    |
| 3  | −55.15   |        |      |    |
|    |          | 3.9    | 155  | 49 |
| 4  | −68.15   |        |      |    |
|    |          | 1.0    |      |    |
| 7  | −366.85  |        |      |    |
|    |          | 12.0   | 1.62 | 63 |
| 8  | −95.99   |        |      |    |
|    |          | 3.1    |      |    |
| 9  | −100.95  |        | 1.61 | 44 |
|    |          | 3.9    |      |    |
| 10 | −241.69  |        |      |    |
|    |          | 1072.4 |      |    |
| BE |         |        |      |    |

What is claimed is:

1. A scanning system having
   a light source,
   a collimator lens,
   a scanning unit, and
   a scanning objective,
   characterized by, for correction of the chromatic aberration over a large wavelength range said scanning objective is corrected only with respect to the transverse chromatic aberration, and focal intercepts of light rays having wavelengths in the wavelength range in which said scanning system is to be corrected with respect to chromatic aberration which are located behind said collimator lens are dimensioned in such a manner that the scanning system is also compensated with respect to the longitudinal chromatic aberration, and images of a multiplicity of light sources emitting light in different wavelength regions formed by rays reflected into the collimator lens are focused by said scanning objective in one plane.

2. A scanning system according to claim 1, characterized by said collimator lens having a longitudinal chromatic aberration which compensates the longitudinal aberration of said scanning objective.

3. A scanning system according to claim 1, characterized by said scanning objective having a plurality of lenses.

4. A scanning system according to claim 3, characterized by the last lens, seen from said scanning unit, of said scanning objective being a lens which has a negative refractive power and is composed of a glass having an Abbe number smaller than 55 and the first surface of which has a center of curvature which lies on the scanning unit side.

5. A scanning system according to claim 3, characterized by the first surface of the first lens, seen from said scanning unit, of the scanning objective having a center of curvature which lies on the scanning unit side.

6. A scanning system according to claim 3, characterized by the distance between the apex of the first lens of the scanning objective and the scanning unit being 0.7 times larger than the diameter of the pupil of said objective.

7. A scanning system according to claim 3, characterized by for said scanning objective being:
   first lens: positive refractive power, Abbe number>50
   last lens: negative refractive power; Abbe number<55.

8. A scanning system according to claim 3, characterized by for said scanning objective the ratio of the radius of curvature of the second surface of the first lens to the radius of curvature of the first surface of said second lens being:

$$0.5 < r_2/r_3 < 2.5.$$

9. A scanning system according to claim 8, characterized by $$0.75 < r_2/r_3 < 1.38$$

applying.

10. A scanning system according to claim 8, characterized by for said scanning objective being:
    second to the last lens: positive refractive power, Abbe number>50
    last lens: negative refractive power, Abbe number<55.

11. A scanning system according to claim 3, characterized by the ratio of the radius of the curvature of the second surface of said scanning objective of the second to the last lens to the radius of curvature of the first surface of the last lens being:

$$0.55 < r_{2v1}/r_{11} < 1.55.$$

12. A scanning system according to claim 11, characterized by $$0.69 < r_{2v1}/r_{11} < 1.44$$

applying.

13. A scanning system according to claim 1, characterized by a mechanical limitation of the beam path lying before said scanning unit.

14. A scanning system according to claim 1, characterized by said scanning objective having three or four lenses.

15. A scanning system according to claim 1, characterized by said scanning objective having more than four lenses.

16. A scanning system according to claim 1, characterized by said collimator lens being designed as an achromat.

17. A scanning system according to claim 1, characterized by said collimator lens being a single lens.

* * * * *